Dec. 4, 1951
C. H. ADAMS ET AL
2,577,442
WORK HANDLING AND TOOLING MECHANISM
Filed March 15, 1946
4 Sheets-Sheet 1
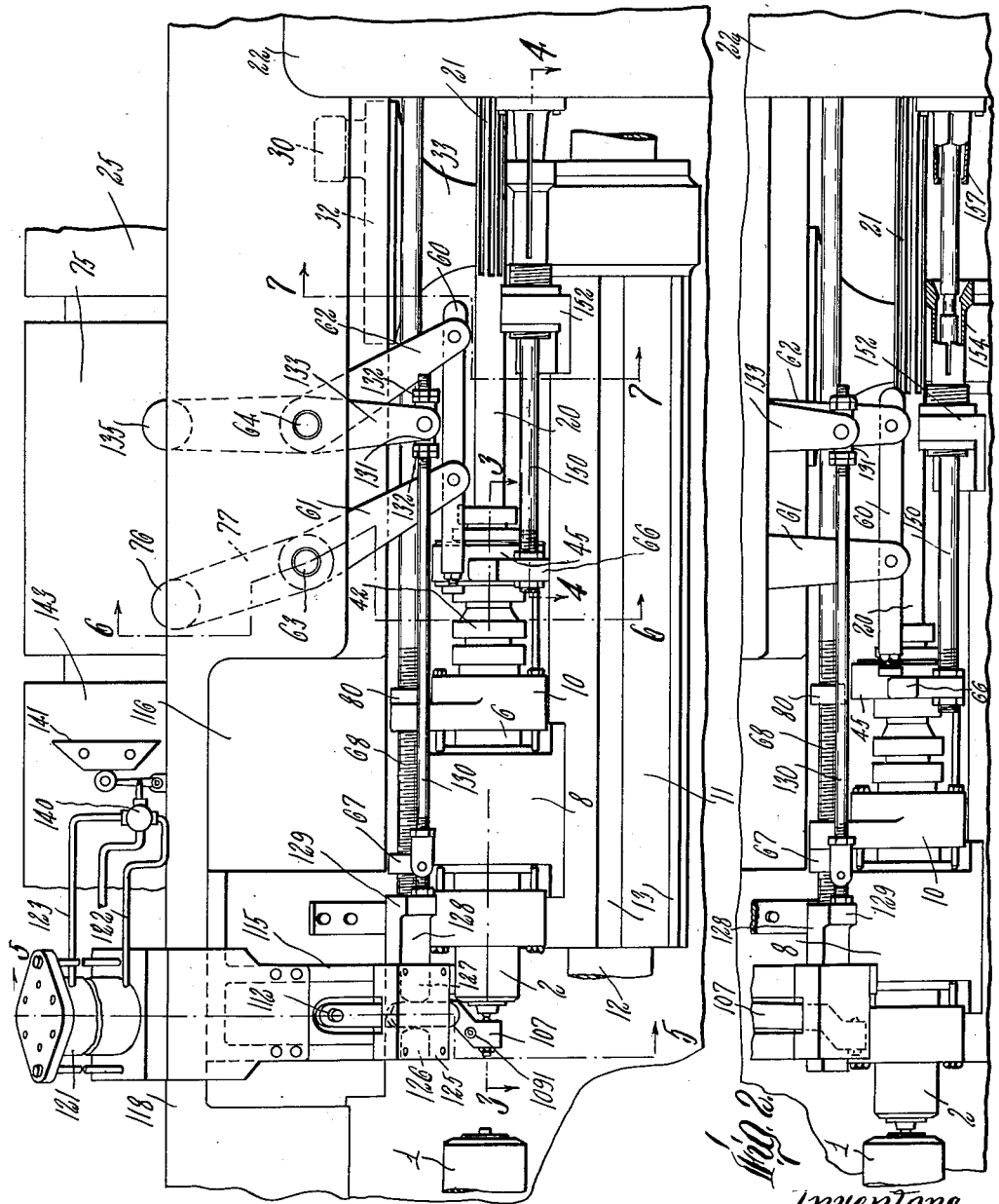

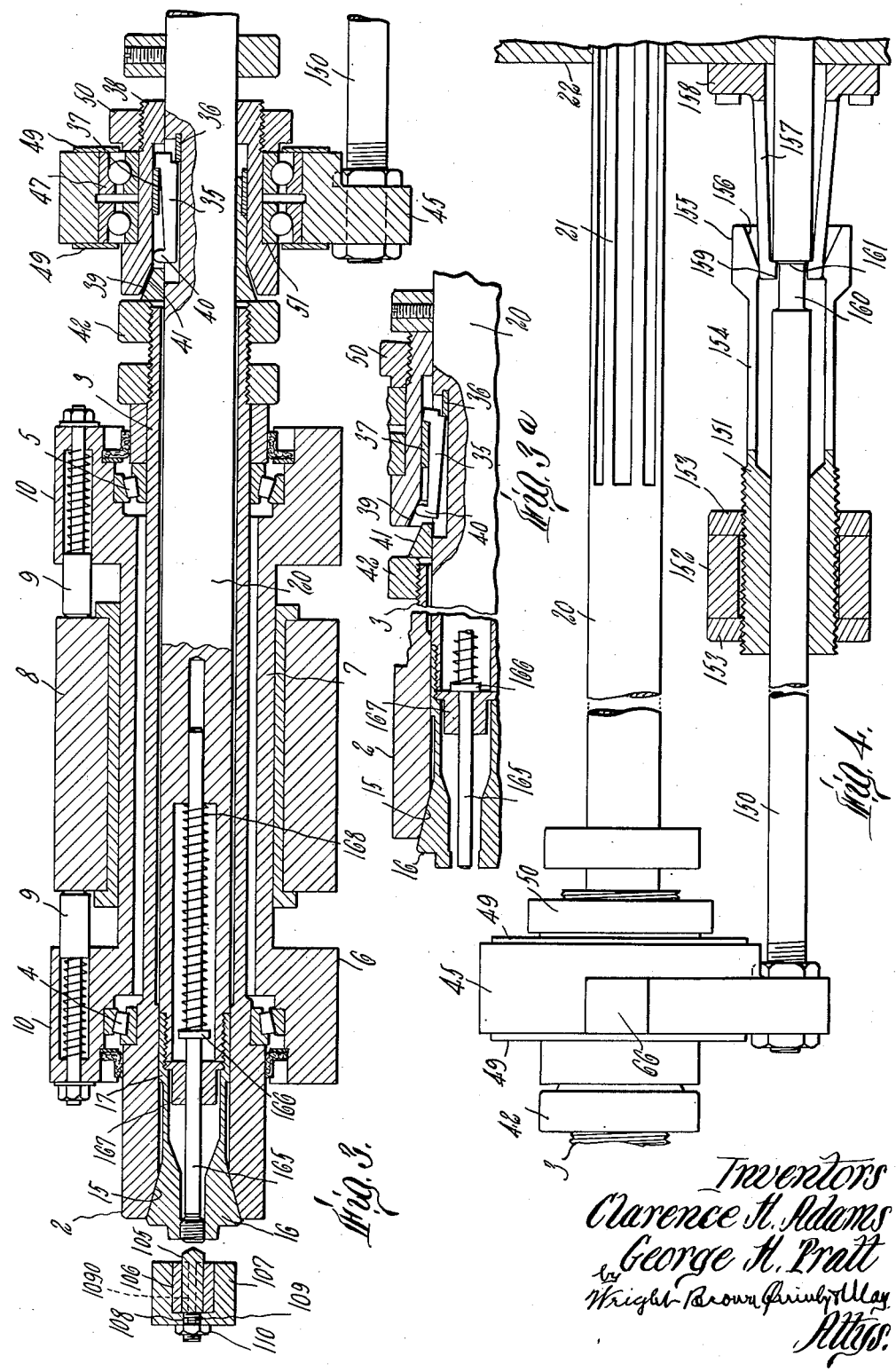

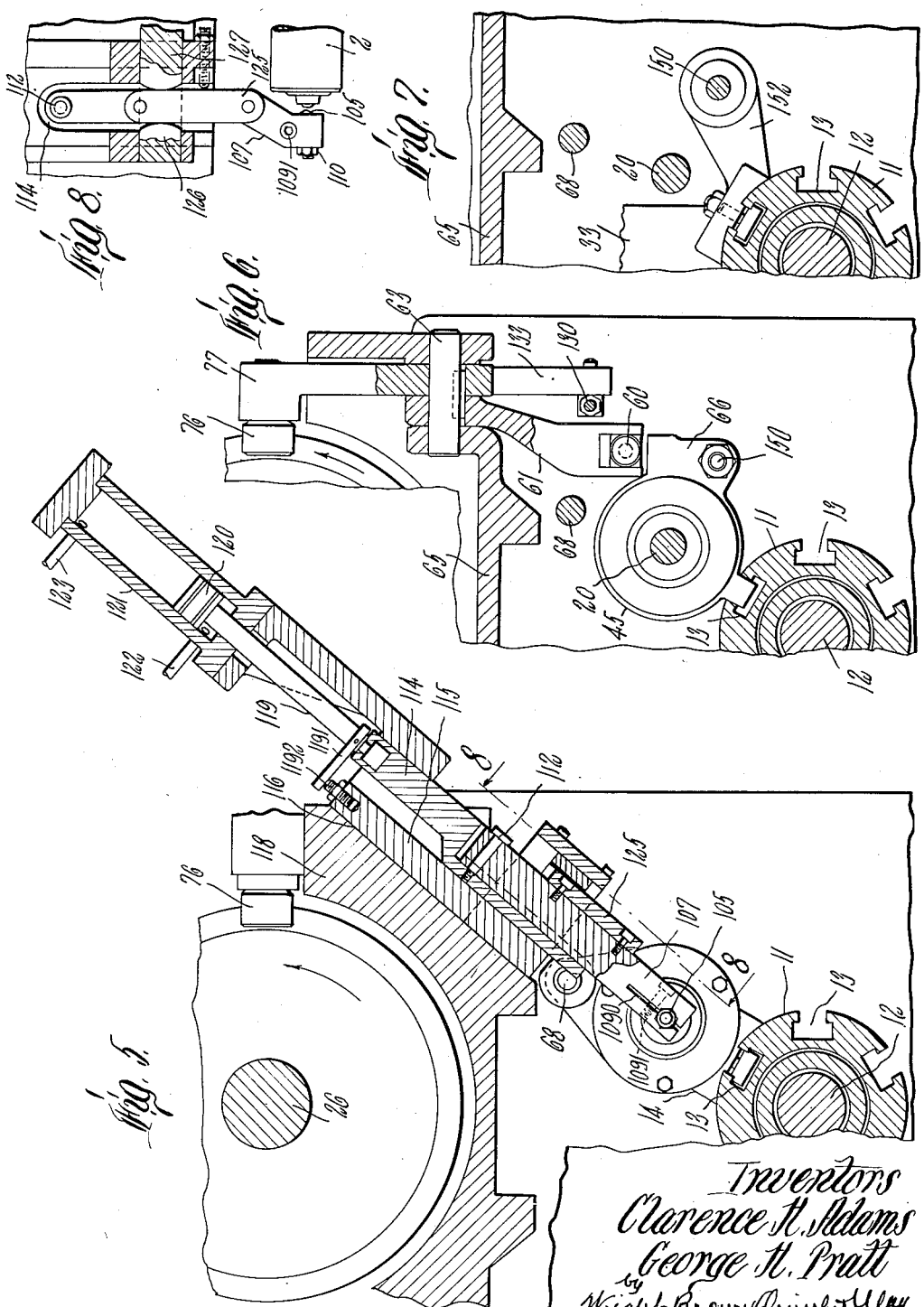

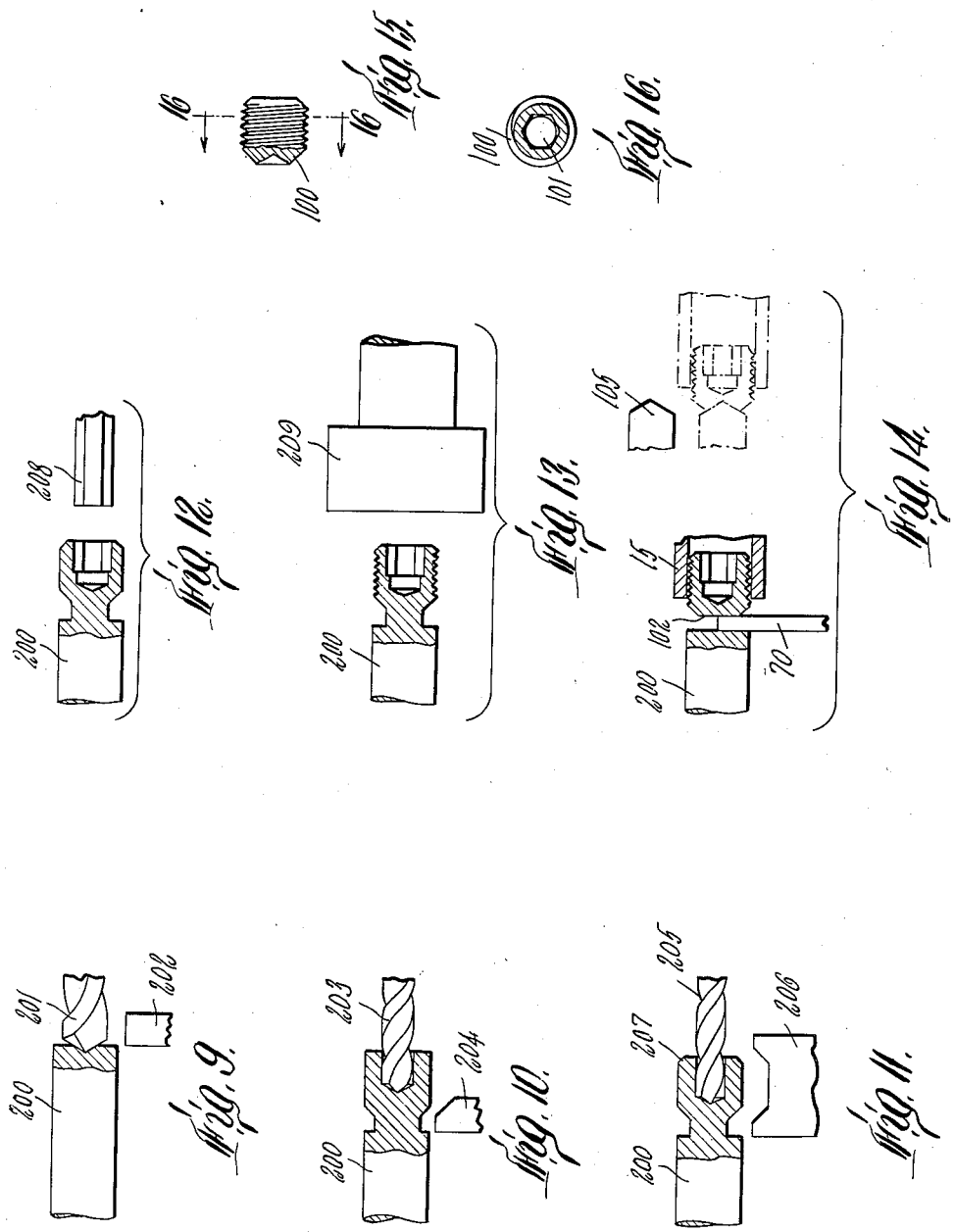

Patented Dec. 4, 1951

2,577,442

UNITED STATES PATENT OFFICE 2,577,442

WORK HANDLING AND TOOLING MECHANISM

Clarence H. Adams and George H. Pratt, Windsor, Vt., assignors to Cone Automatic Machine Company Inc., Windsor, Vt., a corporation of Vermont Application March 15, 1946, Serial No. 654,627

5 Claims. (Cl. 29—37)

This invention relates to mechanism for supporting a work piece after it has been severed from a length of stock, and for doing a machining operation at or adjacent to the severed surface. As illustrated herein, this mechanism forms an attachment for a lathe which may have a plurality of work spindles moved successively from one to another operative station, in some of these stations tool operations being carried out on the work piece before it is severed from the length of stock. At the station where the work piece is severed from the stock, the attachment comes into action to support the work piece while it is being severed and after such severance it continues to support the work during further machining. While the invention is not limited to the production of any particular article, the mechanism shown, and which will be fully described hereinafter, is arranged to pick off set screws formed and cut from bar stock, and to spot drill the inner ends of these set screws.

One object of the invention is to provide a work piece support or pick-off spindle movable to take the work piece and after the work has been severed from the stock to position the work piece for further tooling.

A further object is to provide moving means for the work piece supported, which also may move certain of the tools for previous operations, but each without interference from the other.

Still another object is to provide improved means for causing the work piece supporting means to clamp and release the work at the desired times, and when the work piece has been released, to eject it from the supporting means.

Another object is to provide improved means for moving a tool into and out of operative relation to the severed work piece while it is held by the work piece support, and for causing the tool to operate upon the work piece at the proper time and to the desired extent.

Further objects and advantages will appear from the following description of an embodiment of the invention in which Figure 1 is a fragmentary front elevation of a multiple spindle lathe showing the attachment in position.

Figure 2 is a fragmentary plan view of the same.

Figures 3 to 7, inclusive, are detail sectional views on the correspondingly numbered section lines of Figure 1, the work piece being shown clamped in Figure 3.

Figure 3a is a view similar to a portion of Figure 3, but showing the work clamp open.

Figure 8 is a detail sectional view on line 8—8 of Figure 5.

Figures 9 to 14, inclusive, are diagrammatic views showing the tooling operations performed at successive tooling stations of the machine.

Figure 15 is a view partly in side elevation and partly broken away and in section of the completed work piece.

Figure 16 is a sectional view on line 16—16 of Figure 15.

The invention is shown as applied to a multiple spindle lathe of the type shown in the Miller Patent No. 2,236,440 granted March 25, 1941, for Automatic Multiple Spindle Machine, and the tooling shown is suitable for such a machine having six stock spindles which are presented successively into the various tooling stations by indexing action of the stock spindle carrier as is well understood in the art. A spindle in one of these stations, and where the operating mechanism more particularly involving the present invention is situated, is shown at 1 in Figures 1 and 2. Alined with a spindle in this station is a pick-off spindle 2, the forward end of which is shown in section in Figures 3 and 3a. This spindle 2 comprises a sleeve 3 journaled for rotation in a pair of axially spaced bearings 4 and 5 in a spool-shaped sleeve 6. The reduced diameter portion 7 of this sleeve 6 has slidably mounted thereon a bushed sleeve 8 which is yieldingly held centered on the reduced portion 7, as by oppositely disposed spring pressed plugs 9, slidably mounted in the end enlarged diameter portions 10 of the sleeve 6. This sleeve 8 forms a portion of a carriage which is fixed to the tool-carrying turret 11 of the machine, this tool-carrying turret being mounted for axial motion on a central shaft 12 which also forms a part of the mounting of the stock spindle carrier and about which this carrier is indexed. This tool-carrying turret in the Miller patent is numbered 424. As herein shown it is provided with T slots 13 lengthwise thereof in which may be secured holders for various end working tools. An extension 14 (see Figure 5) from the sleeve 8 engages the outer face of the turret 11 and is clamped in one of these slots 13 in the same manner that other tool carriers are clamped. The pick-off spindle is thus arranged in axial alinement with the one of the tooling stations of the stock spindles and is movable axially from and toward the stock spindles successively as they occupy this station.

Referring further to the pick-off spindle, the forward end of the sleeve 3, as shown in Figure 3, this being the end nearest to the stock spindles, is provided with an internal tapered face 15 with which cooperates the matingly tapered portion of a spring collet 16. This spring collet has its shank portion 17 threaded onto the adjacent end of a shaft 20 which extends through the sleeve 3. As shown best in Figures 1 and 2, the rear end of this shaft 20 is splined as at 21 and extends into the end column 22 of the machine where is positioned the drive mechanism for rotating the central shaft 12 by which the spindles are rotated and by which the shaft 20, which takes the place of an end working tool drive shaft, is driven at the same speed and in the same direction as is the stock spindle alined therewith. The mechanism by which this is accomplished is shown in detail in the Miller Patent No. 2,236,440 to which reference has already been made.

The pick-off spindle is movable axially to pick off a work piece from that particular stock spindle which is in alinement therewith at any particular time, after that work piece has been cut off from the stock projecting from the stock spindle. This axial motion of the pick-off spindle is accomplished by the axial motion of the tool-carrying turret 11, this being accomplished by action of suitable cams (not shown) on a cam drum 25 carried by a cam shaft 26 (see Figure 5) which is mounted above and parallel to the shaft 12. This shaft 26 also carries other cam drums which control other portions of the machine cycle as is well understood in the art. The cams on the drum 25 which move the tool-carrying turret 11 axially operate upon a cam follower 30 (see Figure 1) carried by a slide 32 connected through an extension 33 to the turret 11.

The spring pressed plugs 9 permit the extent of motion of the turret 11 to be adjusted for the requirements of other end working tools which are required to be moved further than is the pick-off spindle, the spring pressed plugs 9 yielding for this additional motion of the tool turret after the pick-off spindle has been given its desired extent of axial motion. The pick-off spindle is stopped by impingement of the right hand portion 10 of the sleeve 6 on one or the other of two adjustable stop nuts 67 and 80 threaded on a stop rod 68. The collet gripping means is actuated to grip and release the work by relative axial motion between the sleeve 3 and the shaft 20, and this motion in collet-closing direction is produced by the camming action of a plurality of fingers 35 arranged around the shaft 20, each seated in a slot in the shaft 20 and adapted to bear at their inner edges on wear pieces 36 set into the shaft 20 and oppositely thereto on a wear ring 37 which is mounted within a collar 38 axially slidable on the shaft 20. This collar 38 houses the fingers 35 and at its forward end is provided with a tapered mouth 39, which when the collar 38 is retracted to release the collet, as in the position of Figure 3a, allows the rounded forward extremity 40 of each of the fingers 35 to ride outwardly, relieving the wedging action of the rear ends of the fingers between the wear pieces 36 and 37. This allows the shaft 20 and the sleeve 3 to move relatively axially in a direction to relieve the wedging pressure on the collet 15 and thus allowing the collet to open, as shown in Figure 3a.

The wear ring 37 is carried by a sleeve 41 which bears against a collar 42 threaded onto the rear end of the sleeve 3, adjustment of this collar on the threaded extremity determining the amount of tightening of the collet 15, the extent of which may be adjusted to suit the size of the work pieces.

The axial motion of the sleeve 38 in order to produce opening and closing of the gripping collet is produced by axial motion of a collar 45 surrounding the sleeve 38 and between which and this sleeve are interposed the ball bearings 47. These bearings permit the free rotation of the sleeve 38 with the shaft 20, but cause axial motion of the collar 45 to be communicated to the sleeve 38, as by oppositely disposed rings 49 carried by the collar 45 and overlapping the outer raceways of the bearings 47. A nut 50 threaded on the rear extremity of the sleeve 38 holds these bearings against a shoulder 51 on the sleeve 38.

Two mechanisms are shown for moving the collar 45 axially, one of these in a direction to close the collet and the other in the other direction to open the collet. The closing means consists of a bar 60 (see Figures 1, 2 and 6) which is pivotally supported by a pair of links 61 and 62 to the lower ends of which it is pivoted, these links being fulcrumed at 63 and 64 to a frame portion 65 which extends beneath the cam shaft 26. The links 61 and 62 provide a parallel motion which maintains the bar 60 in substantially horizontal position, but as it swings from the position shown in Figure 1 where the links are inclined to the vertical to the position shown in Figure 2 where they are vertical, the forward end of the bar 60 may impinge upon a lug 66 carried by the ring 45 and force it and the shaft 20 forwardly in the direction to close the collet, this being done only when the pick-off spindle has been moved forward to its forward limit into the position of Figure 2 where the gripping mechanism engages with the end of the stock projecting from the stock spindle at that station.

The forward motion of the pick-off spindle is terminated at a point sufficiently far from the end of the stock spindle to permit a cutting tool shown at 70 in Figure 14 to pass between the spindles and to sever the work piece from the stock so that the work piece is then held by the pick-off spindle alone, the gripper of which has been closed thereupon. This swinging motion of the bar 60 is accomplished by suitable cams on a cam drum 75 also fixed to the cam shaft 26, these cams acting upon a follower 76 on a lever 77 which is fulcrumed on the pivot 63 which is keyed to the upper end of the arm 61 and to the lever 77.

After the cutting off tool 70 has severed the work piece from the stock, the pick-off spindle is retracted, this being accomplished by the retraction of the tool slide or turret through the action of the cams acting on the follower 30. This retraction of the pick-off spindle, the bar 60 then being in inoperative position as shown in Figure 1 and out of alinement with the lug 66, takes place until the right hand portion 10 strikes against the rear adjustable stop 80 carried by the fixed stop bar 68. When in this retracted position, a tooling operation is performed on the work piece held by the pick-off spindle, and which was severed from the stock in the stock spindle.

As shown this tooling operation consists of spot drilling the inner end of the work piece. Referring to Figures 3, 14, 15 and 16, the work piece illustrated is a set screw 100 having a socket 101 (see Figures 14 and 16) in its outer end, and cut off from the stock leaving a flat face 102 which is spot drilled while the work piece is held by the pick-off spindle. The spot drill as shown in Figures 1, 3, 8 and 14 is a stationary drill element 105 held by a split bushing 106 in a socket in the arm 107 and is backed up by an adjustable screw 108 which extends through a hole 109 in the arm 107 (Figure 3). The screw 108 has threaded thereon a check nut 110 by which it may be secured in the desired lengthwise position relative to the work piece. To secure the drill 105 and split bushing 106 from turning, the member 107 has been split at 1090 and the headless screw 1091 exerts the clamping pressure. The arm 107 is fulcrumed at 112 at its upper end to a slide 114 mounted for axial motion in a guide 115 secured to the downwardly and inwardly inclined front face 116 of the top frame member 118 of the machine. To the upper end of the slide 114 is secured the lower end of the piston rod 119, carrying at its upper end a piston 120 slidable within a fluid pressure cylinder 121. This cylinder has at its ends pipe connections 122 and 123 through which fluid, such as air, under pressure may be supplied or discharged in order to move the slide 114 between an upper retracted position and a lower operative position, the latter of which positions is illustrated in Figures 1 and 5. To properly position the drill 105 centrally with the work, the slide 114 has secured thereto a stop member 1191 contacting a stop button 1192.

To the outer face of the arm 107 is secured a hardened wear piece 125 which extends between a pair of convex abutments 126 and 127 (see particularly Figures 1 and 8) carried by a horizontally arranged slide 128. This slide 128, as shown best in Figures 1 and 2, has a forwardly extended end bracket 129 to which is secured an actuating rod 130. The opposite end portion of this rod is adjustably fixed, as by a pivot sleeve 131 backed up by lock nuts 132 on a threaded portion of the rod 130, to the lower end of a rock arm 133 which is fulcrumed on the pivot pin 64, and has at its upper end a cam follower 135 (see Figure 1) adapted to be moved by suitable cams (not shown) on the cam drum 75 which also carries cams for actuating the cam follower 76.

When the pick-off spindle is in retracted position, the slide 114 is lowered through control of the fluid pressure to and from opposite ends of the cyclinder 121 as through the valve 140 (see Figure 1) actuated by a cam 141 secured to the cam drum 143, which is carried by the cam shaft 26.

At this time the slide 128 is in the position shown in Figure 2, but when the slide 114 has been lowered, the cam follower 135 is actuated to pull the slide 128 to the right into the position shown in Figure 1, which brings the tool 105 into operative engagement with the work piece and causes the tool 105 to center bore the inner end of the set screw as shown in Figures 14 and 15, the work being revolved by the rotation of the pick-off spindle while the tool 105 is stationary.

When this operation has been completed, the tool is retracted from the work piece by left hand motion imparted to the slide 128 and the tool slide 114 is thereupon lifted to its inoperative position. The work piece has now been completed.

Next, the tool slide is moved forward from its retracted position, but as this motion takes place the completed work piece is freed from the pick-off spindle. This is done by the action of a latch rod 150 which is secured at its left hand end to the collar 45, as shown best in Figures 1, 2, 3 and 4. This latch rod 150 is slidably guided through a sleeve 151 which is adjustable axially within a bracket 152 secured to the tool turret 11. Collars 153 threaded on the sleeve 151 and engaging opposite faces of the bracket 152 may be turned to adjust the collar 151 axially. Its free end portion is formed with a plurality of spring fingers 154 having heads 155, each provided with a tapered internal face 156. When the tool turret retracts, this sleeve is retracted with it and the faces 156 ride up over the forward ends of a series of spring fingers 157 extending forwardly from a flanged collar 158 secured to the forward face of the machine column 22, this acting to resiliently force hooked extremities 159 of the fingers 157 inwardly, so that when the latch rod 150, which moves with the collar 45, is retracted sufficiently, these extremities 159 engage within a reduced diameter portion 160 of the latch rod 150. This is the position of the parts when the pick-off spindle is in fully retracted position, as shown in Figure 4. When the pick-off spindle starts to move forwardly, these hooked extremities 159 engage against the annular shoulder 161 of the latch rod and hold it from motion with the pick-off spindle. This results in a relative motion between the collar 45 and the pick-off spindle in a direction to release the collet 15, freeing the finished work piece therefrom. The work piece is immediately ejected from the collet gripper by an ejector rod 165 slidably mounted in the outer end portion of the shaft 20 and normally pressed outwardly as far as permitted by engagement of a collar 166 thereon against a driving abutment block 167 by means of the coil spring 168. The pick-off spindle is now empty and with its gripper open in position it continues its advance to take another work piece from one of the stock spindles and completes the cycle, as heretofore described. As soon as the tool turret has progressed a short distance on its forward motion, the portions 155 of the fingers 154 move out of contact with the spring fingers 157, thus freeing the latch rod 150 for forward motion with the pick-off spindle.

In Figures 9 to 14 are illustrated various tooling operations which may be performed on the bar stock at the several tooling stations, including the final tooling performed by the attachment of this invention. Thus in Figure 9, the end of the bar stock 200 is being spot drilled by the drill 201 at the first tooling station of the machine, and a facing tool 202 may act upon the end portion of the stock projecting from the stock spindle after the drill 201 has been removed. At the next or second tooling station (Figure 10) to which the stock has been indexed from the first station, a drill 203 may start the boring of the end hole in the work piece and a tool 204 may partly sever the work piece from the bar of stock. At the next or third index station (Figure 11), the drilling may be continued by the drill 205 and a side forming tool 206 may chamfer the forward edge 207 of the work and finish to size the outside of the work piece. At the next or fourth index station (Figure 12), a broaching tool 208 of polygonal cross section shapes the outer portion of the hole in the work piece to the desired polygonal outline as shown in Figure 16. In the next or fifth station (Figure 13), the outside of the work piece is threaded as by the die 209.

The work piece is now in condition to be engaged by the pick-off spindle at the sixth station, the gripper 15 engaging its outer face, and the cutting off tool 70 completes the severing of the work piece from the bar stock. The severed work piece then is moved to the dotted line position shown in Figure 14, and the tool 105 is moved into alinement with it and pressed into contact therewith to form the final center or cupping operation as heretofore described.

From the foregoing description of an embodiment of this invention it should be evident to those skilled in the art that various changes and modifications might be made without departing from its spirit or scope.

We claim:

1. In combination, an axially movable pick-off spindle, a work gripper carried by said spindle, an element movable axially of said spindle and operatively connected to said gripper for closing and opening said gripper, a latch rod carried by said element and having a shoulder, a finger for engaging said shoulder and holding said latch rod when said spindle is advanced to cause said gripper to open, a movable member for moving said pick-off spindle, spaced stops with which a portion carried by said spindle may engage for limiting said spindle motion to an extent less than that of said movable member, means for moving said member, and a finger-engaging element carried by said member effective on further motion of said member in retracting direction after said spindle is stopped to force said finger into engagement with said shoulder and releasing said finger after said gripper has been opened on advancing motion of said member.

2. In combination with a reciprocating carrier, of a rotary pick-off spindle movable axially with said carrier, means limiting the axial motion of said spindle in the direction away from pick-off position while the motion of said carrier may continue, a work piece gripper carried by said spindle, a sleeve axially movable on said spindle and connected to open and close said gripper by relative axial motion between said spindle and sleeve, a collar in which said sleeve is journaled for rotation of said sleeve with said spindle while said collar is non-rotatable, cam actuated means impinging on said collar and moving said collar in work-gripping closing position when said spindle is at its forward limit of motion, and means conditioned by continued retraction of said carrier after the axial motion of said spindle has been stopped for moving said collar in the opposite direction to release the work during the forward motion of said spindle.

3. In combination with a reciprocating carrier, of a rotary pick-off spindle movable axially with said carrier, means limiting the axial motion of said spindle in the direction away from pick-off position while the motion of said carrier may continue, a work piece gripper carried by said spindle, a sleeve axially movable on said spindle and connected to open and close said gripper by relative axial motion between said spindle and sleeve, a collar in which said sleeve is journaled for rotation of said sleeve with said spindle while said collar is non-rotatable, cam actuated means impinging on said collar and moving said collar in work-gripping closing position when said spindle is at its forward limit of motion, means conditioned by continued retraction of said carrier after the axial motion of said spindle has been stopped for moving said collar in the opposite direction to release the work during the forward motion of said spindle, and a spring ejector for moving the work piece from the gripper as soon as said gripper is opened.

4. In combination with a reciprocating carrier, of a rotary pick-off spindle movable axially with said carrier, means limiting the axial motion of said spindle in the direction away from pick-off position while the motion of said carrier may continue, a work piece gripper carried by said spindle, a sleeve axially movable on said spindle and connected to open and close said gripper by relative axial motion between said spindle and sleeve, a collar in which said sleeve is journaled for rotation of said sleeve with said spindle while said collar is non-rotatable, means actuable to close said work gripper on a work piece when said spindle is in its forward position, a rod fixed to said collar and having a reduced diameter portion forming a forwardly facing annular shoulder, spring fingers normally held out of engagement with said shoulder, and a wedge device movable with said carrier by continued motion of said carrier after the retraction of said spindle has been stopped in position to flex said spring fingers to engage said reduced diameter portion in position to engage on said shoulder on subsequent advance of said spindle thus to hold said collar as said spindle continues to advance and thereby move said collar relative to said spindle in work piece releasing direction.

5. In combination with a reciprocating carrier, of a rotary pick-off spindle movable axially with said carrier, means limiting the axial motion of said spindle in the direction away from pick-off position while the motion of said carrier may continue, a work piece gripper carried by said spindle, a sleeve axially movable on said spindle and connected to open and close said gripper by relative axial motion between said spindle and sleeve, a collar in which said sleeve is journaled for rotation of said sleeve with said spindle while said collar is non-rotatable, means actuable to close said work gripper on a work piece when said spindle is in its forward position, a rod fixed to said collar and having a reduced diameter portion forming a forwardly facing annular shoulder, spring fingers normally held out of engagement with said shoulder, a wedge device movable with said carrier by continued motion of sad carrier after the retraction of said spindle has been stopped in position to flex said spring fingers to engage said reduced diameter portion in position to engage on said shoulder on subsequent advance of said spindle thus to hold said collar as said spindle continues to advance and thereby move said collar relative to said spindle in work piece releasing direction, and a spring ejector for removing the work piece from said gripper as soon as said gripper is opened.

CLARENCE H. ADAMS.
GEORGE H. PRATT.

REFERENCES CITED

The following references are of record in the file of this patent:

UNITED STATES PATENTS

| Number | Name | Date |
|---|---|---|
| 330,600 | Marsh | Nov. 17, 1885 |
| 1,912,515 | Davenport | June 6, 1933 |
| 1,947,800 | Rupple | Feb. 20, 1934 |
| 2,061,417 | Drissner et al. | Nov. 17, 1936 |
| 2,170,633 | Drissner | Aug. 22, 1939 |
| 2,326,541 | Kuehn | Aug. 10, 1943 |